(12) United States Patent
Huang

(10) Patent No.: US 6,539,831 B2
(45) Date of Patent: Apr. 1, 2003

(54) CIRCULAR POWER SAW

(75) Inventor: Peter Huang, Taichung (TW)

(73) Assignee: Durq Machinery Corp., Taichung (TW)

( * ) Notice: Subject to any disclaimer, the term of this patent is extended or adjusted under 35 U.S.C. 154(b) by 70 days.

(21) Appl. No.: 09/865,602

(22) Filed: May 29, 2001

(65) Prior Publication Data

US 2002/0178889 A1 Dec. 5, 2002

(51) Int. Cl.[7] .................................................. B27B 5/29
(52) U.S. Cl. ........................... 83/477.2; 83/471; 83/701; 144/286.1; 144/285; 269/16; 248/314; 248/37.6; 312/203
(58) Field of Search ................................ 83/477.2, 481, 83/473, 438, 701, 471; 144/286.1, 286.5, 287, 285; 248/314, 37.3, 37.6, 322, 111, 113; D15/133; 312/203, 316, 107, 111, 109; 108/78, 110, 115; 269/16, 209, 210, 901

(56) References Cited

U.S. PATENT DOCUMENTS

| | | | | |
|---|---|---|---|---|
| 267,041 A | * | 11/1882 | Tyler ............................. 190/3 |
| 2,122,069 A | * | 6/1938 | Michelson ................... 211/107 |
| 3,092,428 A | * | 6/1963 | Kerschner .................... 206/373 |
| 3,812,976 A | * | 5/1974 | Rempel ........................ 211/63 |
| 4,239,195 A | * | 12/1980 | Oltman et al. ............ 144/286.1 |
| 4,378,828 A | * | 4/1983 | Shiminski ..................... 108/35 |
| 4,733,703 A | * | 3/1988 | Cimino ........................ 144/285 |
| 4,953,601 A | * | 9/1990 | Herdies ........................ 144/285 |
| 5,174,349 A | * | 12/1992 | Svetlik et al. ............ 144/286.1 |
| 5,224,531 A | * | 7/1993 | Blohm ......................... 108/110 |
| 5,598,879 A | * | 2/1997 | Chen ............................ 144/285 |
| 5,619,896 A | * | 4/1997 | Chen ......................... 144/286.1 |
| 5,634,649 A | * | 6/1997 | Breining et al. ........... 280/47.35 |
| 5,690,221 A | * | 11/1997 | Yeh ............................ 206/308.1 |
| D397,344 S | * | 8/1998 | Ceroll et al. ................ D15/133 |
| D408,634 S | * | 4/1999 | Shabestari .................... D3/319 |
| 5,997,116 A | * | 12/1999 | Schmidt ....................... 206/373 |

* cited by examiner

Primary Examiner—Boyer D. Ashley
(74) Attorney, Agent, or Firm—Browdy and Neimark

(57) ABSTRACT

A circular power saw includes a saw base having a stand and a table on the stand, and a tool rack coupled to one side of the stand and turned between the open position and the close position for keeping tools.

5 Claims, 4 Drawing Sheets

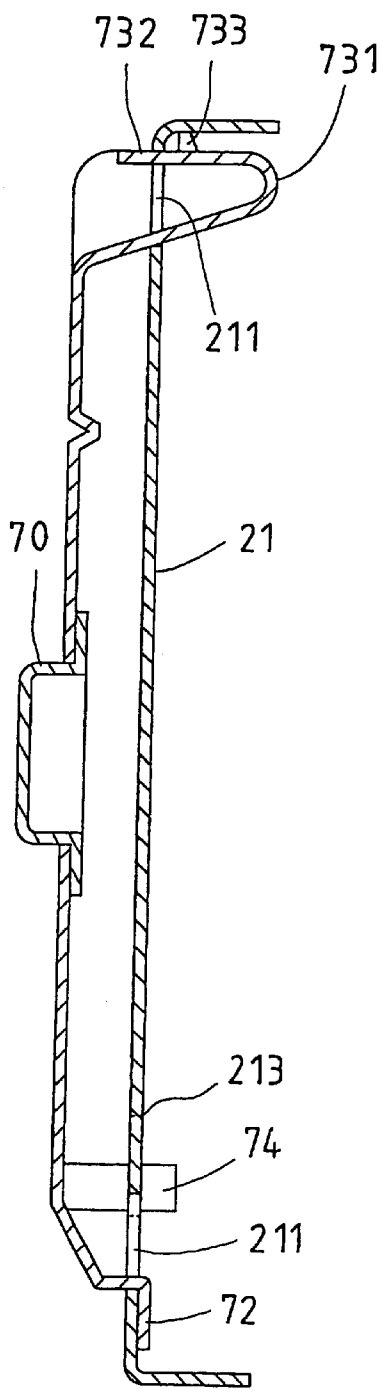
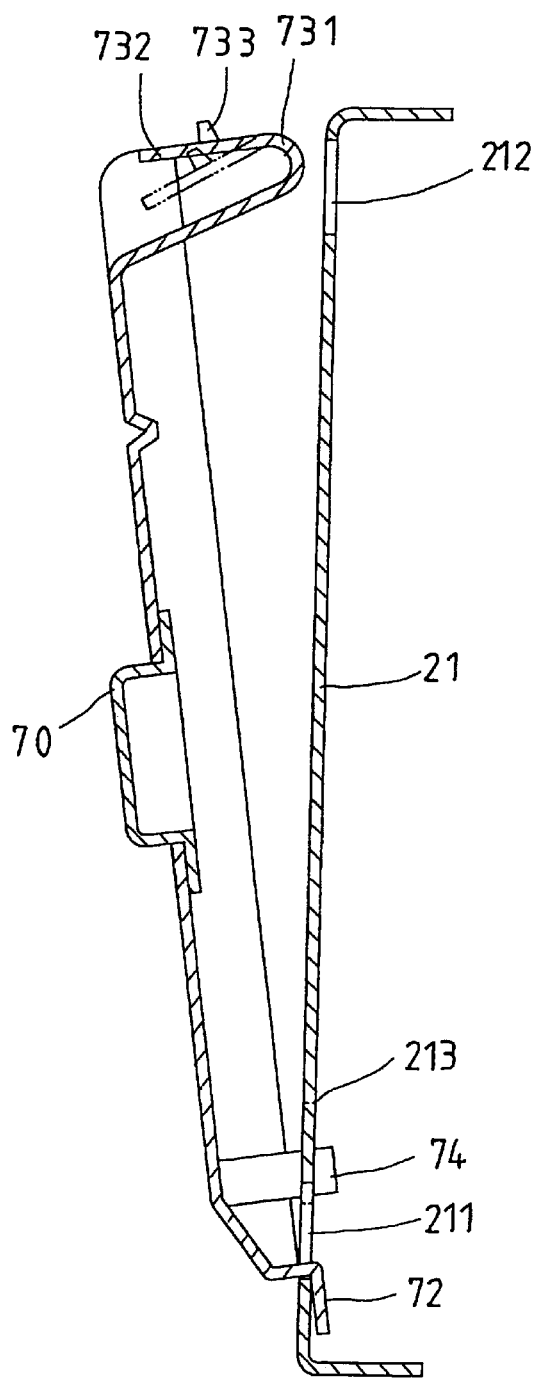
FIG. 4
FIG. 5

CIRCULAR POWER SAW

BACKGROUND OF THE INVENTION

The present invention relates to a power saw, and more particularly to a circular power saw which has tool rack means adapted to keep tools.

When mounting or dismounting a circular power saw, particular wrench means (combination wrenches, Allen wrenches, and the like) shall be used. In order to keep these hand tools, a tool rack or tool storage box is needed. However, because a conventional circular power saw has no space for a tool rack or tool storage box, the user may directly put the tool rack or tool storage box on the floor, and the work place may be littered with hand tools during the work. Further, after working, the user may forget to receive all hand tools.

SUMMARY OF THE INVENTION

The present invention has been accomplished under the circumstances in view. It is the main object of the present invention to provide a circular power saw, which is equipped with detachable tool rack means adapted to keep tools. According to the present invention, the circular power saw comprises a saw base, the saw base comprising a stand and a table supported on the stand, the table comprising a flat cutting surface; a saw unit mounted in the stand and partially protruding over the flat cutting surface; and a driving unit installed in the stand and adapted to rotate the saw unit; wherein the stand comprises at least at one of two opposite lateral sidewalls thereof a first retaining hole, and at least one second retaining hole; the circular power saw further comprises at least one tool rack coupled to the lateral sidewalls of the stand, the at least one tool rack each comprising one coupling member coupled to the first retaining hole at one lateral sidewall of the stand for enabling the respective tool rack to be turned relative to the stand between an open position and a close position, and at least one retaining device for fastening to the at least one second retaining hole at one lateral sidewall of the stand to secure the respective tool rack in the close position.

BRIEF DESCRIPTION OF THE DRAWINGS

FIG. 4 is a sectional view of a part of the present invention, showing the tool rack closed.

FIG. 5 is a sectional view of a part of the present invention, showing the tool rack opened.

DETAILED DESCRIPTION OF THE PREFERRED EMBODIMENT

Figure 1:
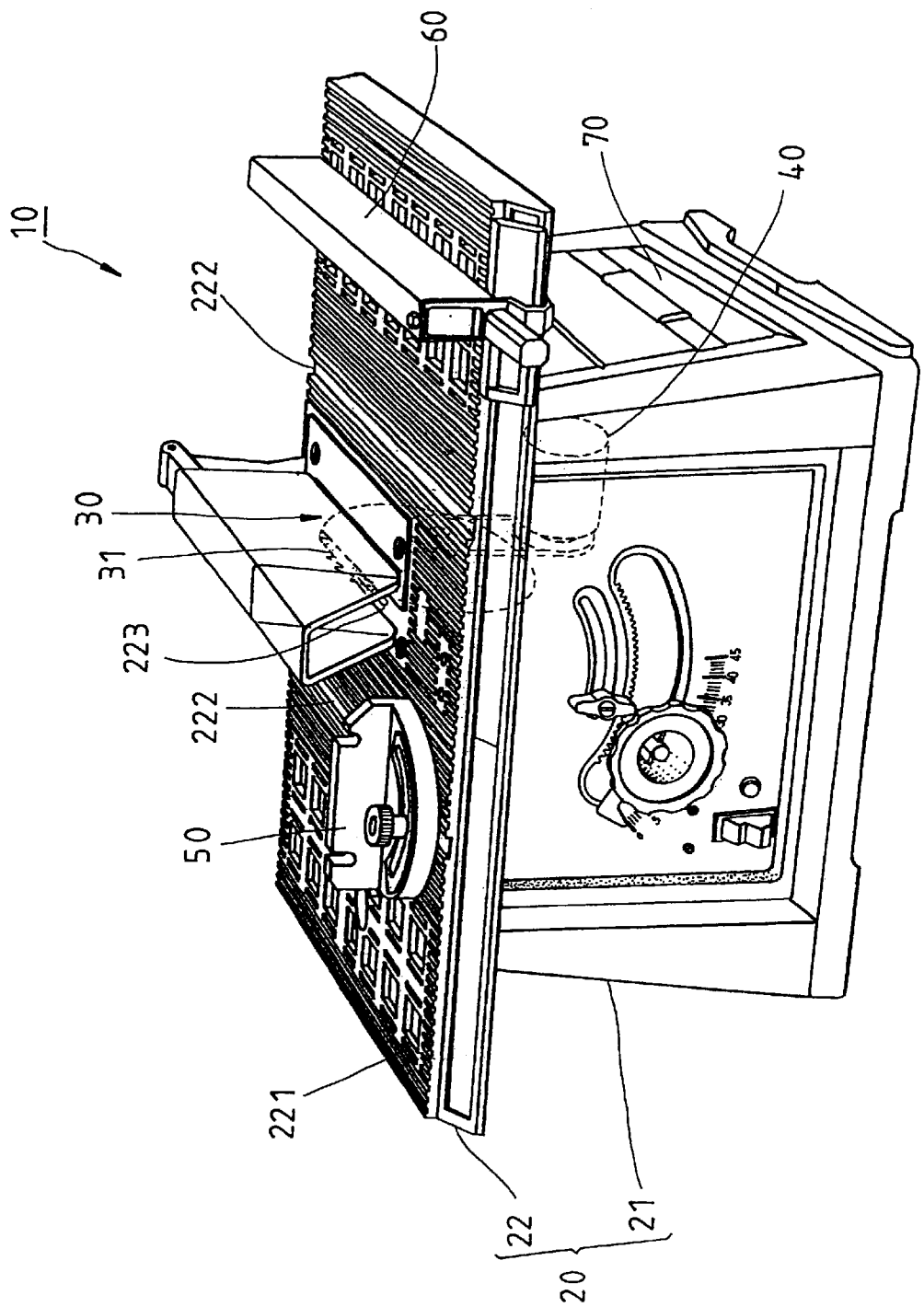
FIG. 1 is a perspective view of a circular power saw constructed according to the present invention.
Figure 2:
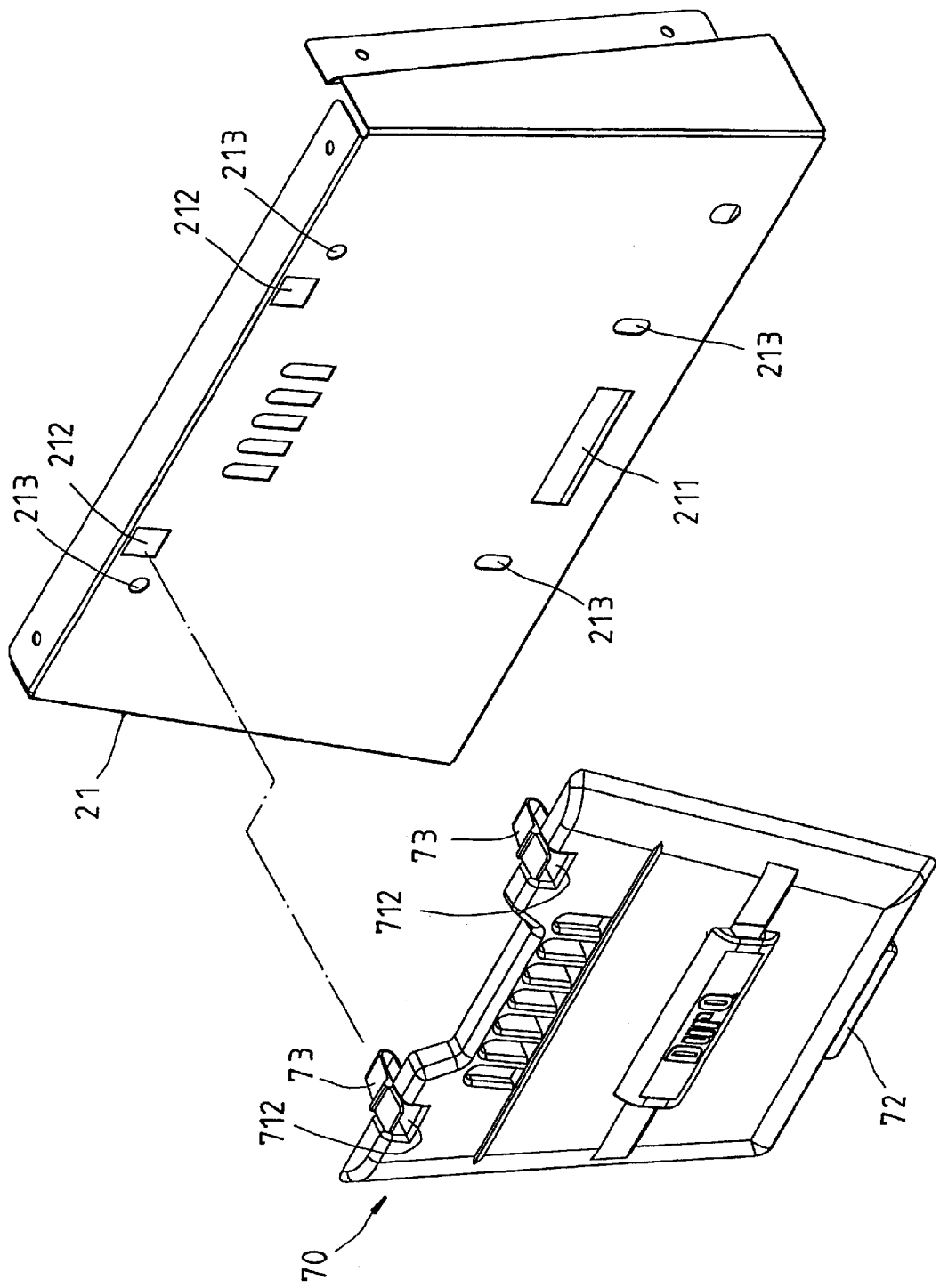
FIG. 2 is an exploded view of a part of the present invention, showing the structure of the stand and the tool rack.

Referring to FIGS. 1 and 2, a circular power saw 10 is shown comprising a saw base 20, a saw unit 30, a driving unit 40, a miter gauge 50, a rip fence 60, and two tool racks 70.(only one shown)

The saw base 20 is the main body of the circular power saw 10, comprised of a stand 21 and a table 22. The stand 21 is a strong quadrilateral frame stably placed on the floor, comprising at each of two opposite lateral sidewalls thereof a first retaining hole 211, two second retaining holes 212, and four third retaining holes 213. The table 22 is mounted on the top of the stand 21, comprising a flat cutting surface 221 adapted to bear the workpiece, a plurality of slots 222 on the flat cutting surface 221, and an elongated opening 223 pierced through the flat cutting surface 221 and the bottom sidewall thereof.

The saw unit 30 is mounted in the stand 21, comprising a circular blade 31 disposed at the bottom side of the table 22. The cutting edge (teeth) of the circular blade 31 protrudes over the cutting surface 221 through the elongated opening 223.

The driving unit 40 is installed in the stand 21 and coupled to the circular blade 31 of the saw unit 30, and controlled to rotate the circular blade 31.

The miter gauge 50 is mounted in one slot 222 of the table 22, and can be moved along the corresponding slot 222 and rotated to the desired angle to set the cutting angle of the workpiece.

The rib fence 60 is mounted on the cutting face 221 with one end thereof coupled to one side edge of the table 22, and can be moved on the cutting face 221 to push the workpiece.

Figure 3:
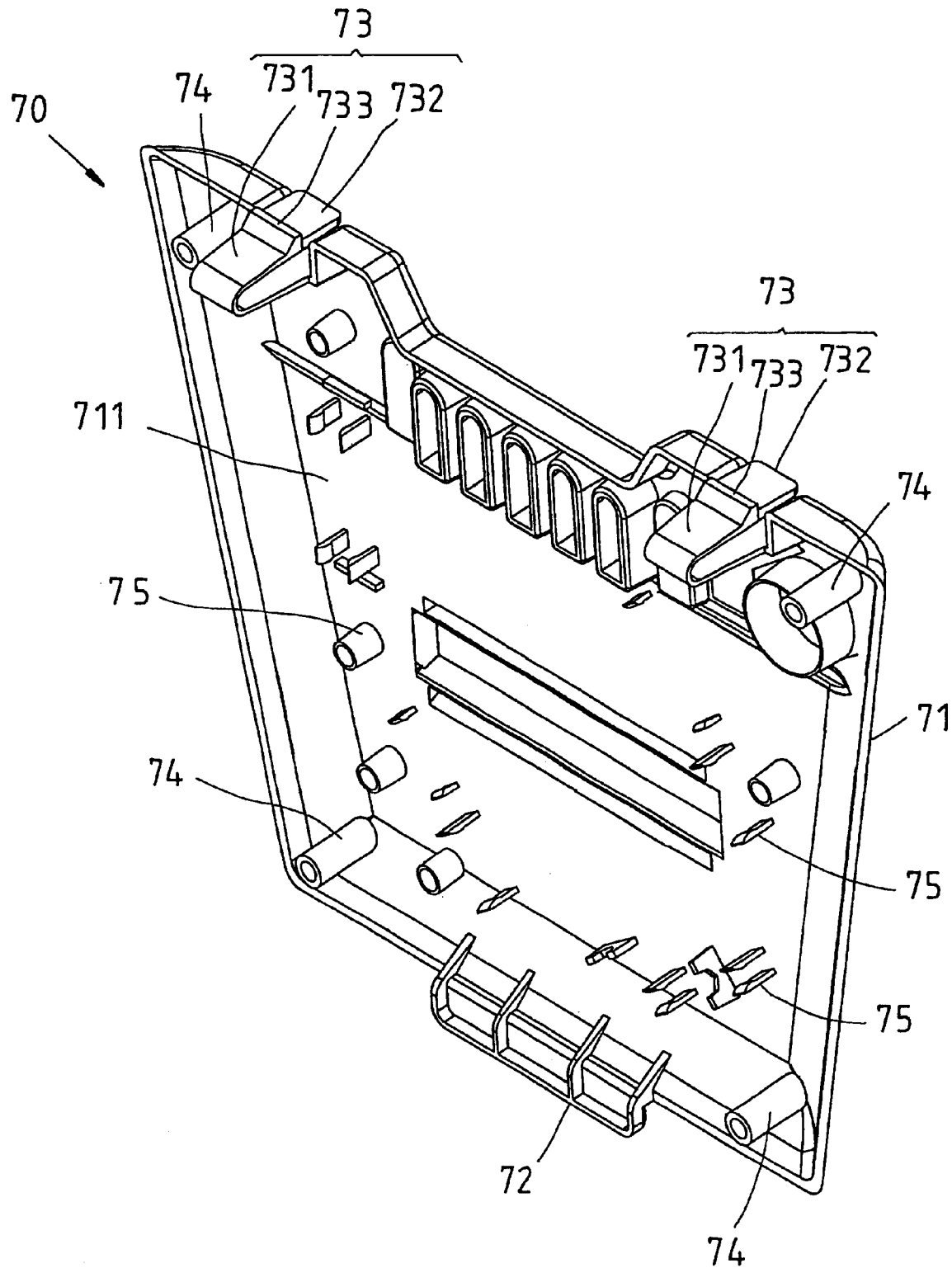
FIG. 3 is an elevational view of one tool rack for the circular power saw shown in FIG. 1.

Referring to FIG. 3, the tool racks 70 are flat, rectangular racks, each comprising a rack body 71, one coupling member 72, two retaining devices 73, four plug members 74, and a plurality of stop elements 75. The rack body 71 is a flat, rectangular member having a receiving area 711 defined by the curved peripheral walls thereof, and two releasing notches 712 corresponding to the second retaining holes 212 of the stand 21. The coupling member 72 extends from one side of the rack body 71 at a distance and then curves in one direction. The retaining devices 73 each comprise a retainer body 731 extended from the bottom side of one releasing notch 712 of the rack body 71, a release handle 732 suspending in the corresponding releasing notch 712, and a retaining block 733 connected between the retainer body 731 and the release handle 732 and projecting upwards. The plug members 74 are cylindrical plugs disposed in the four corners of the receiving area 711 corresponding to the four third retaining holes 213. The stop elements 75 are disposed in the receiving area 711, and adapted to hold down tools in the receiving area 711. By means of fastening the coupling member 72, retaining devices 73 and plug members 74 of each of the tool rack 70 to the first retaining holes 211, second retaining holes 212 and third retaining holes 213 of the stand 21, the tool racks 70 are secured to the stand 21 at two sides.

The aforesaid statement describes the structure of the parts of the circular power saw and their relative positioning. The relation between the tool racks 70 and the stand 21 is outlined hereinafter.

Referring to FIGS. 4 and 5, the coupling member 72 of each tool rack 70 is relatively coupled to the first retaining hole 211 at each of the two opposite lateral sides of the stand 21, and then the plug members 74 and the retaining devices 73 are respectively forced into the third retaining holes 213 and second retaining holes 212 of the stand 21, keeping the retaining block 733 of each of the retaining devices 73 to be hooked in the second retaining holes 212 respectively, and therefore the tool racks 70 are respectively secured to the two opposite lateral sidewalls of the stand 21 (see FIG. 4).

When wishing to pick up a particular tool from one tool rack 70, the release handle 732 of each of the retaining devices 73 of the respective tool rack 70 is respectively pressed downwards toward the bottom side of the respective releasing notch 712 to disengage the respective retaining block 733 from the respective second retaining holes 212, for enabling the respective tool rack 70 to be turned outwards with the respective coupling member 72 in the corresponding first retaining hole 211, and therefore the respective tool rack 70 is opened from the stand 21 to expose its receiving area 711 (see FIG. 5). After the selected tool has been put back to the receiving area 711, the tool rack 70 is turned inwards with the respective coupling member 72 in the corresponding first retaining hole 211 to force the plug members 74 and the retaining devices 73 into engagement with the third retaining holes 213 and second retaining holes 212 of the stand 21 respectively, and therefore the tool rack 70 is closed on the stand 21 (see FIG. 4).

As indicated above, when pressing the release handle 732 of each of the retaining devices 73, the tool racks 70 are unlocked and can be opened from the stand 21 for arrangement of tools in the receiving area 711 of each of the tool racks 70. Because the tool racks 70 are provided at two sides of the stand 21 to keep tools, all tools are kept in good order and concealed from sight when not in use.

A prototype of circular power saw has been constructed with the features of FIGS. 1~5. The circular power saw functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A circular power saw comprising:
  a saw base, said saw base comprising a stand and a table supported on said stand, said table comprising a flat cutting surface;
  a saw unit mounted in said stand and partially protruding over said flat cutting surface; and
  a driving unit installed in said stand and adapted to rotate said saw unit;
  wherein said stand comprises at least one first retaining hole and at least one second retaining hole in at least one of two opposite lateral sidewalls of the stand;
  the circular power saw further comprises at least one detachable tool rack pivotally coupled to an outside portion of said at least one of two opposite lateral sidewalls of said stand, said at least one detachable tool rack comprises one coupling member coupled to the at least one first retaining hole at said at least one of two opposite lateral sidewalls of said stand for enabling the tool rack to be pivoted outwardly and downwardly away from a vertical axis of said stand between an open position and a close position, wherein said open position allows access to an inside portion of the tool rack and said close position prevents access to the inside portion of the tool rack, and at least one retaining device for fastening to the at least one second retaining hole at said at least one of two opposite lateral sidewalls of said stand to secure the tool rack in the close position.

2. The circular power saw of claim 1 wherein said stand further comprises at least at one of the two opposite lateral sidewalls of at least one third retaining hole, and said at last one detachable tool rack further comprises at least one plug member, which is respectively fastened to the at least one third retaining hole of said stand when the tool rack is closed on said stand.

3. The circular power saw of claim 1 wherein said at least one detachable tool rack comprises a receiving area, and a plurality of stop elements respectively disposed in said receiving area and adapted to hold down tools in said receiving area.

4. The circular power saw of claim 1 wherein said at least one retaining device comprise a retainer body extended from a releasing notch on the tool rack for insertion into one of the at least one second retaining hole at said at least one of the two opposite lateral sidewalls of said stand, a release handle suspended in the releasing notch on the tool rack, and a retaining block connected between said retainer body and said release handle and projecting upwards and adapted to hook in the at least one second retaining hole at said at least one of two opposite lateral sidewalls of said stand into which said retainer body is inserted.

5. The circular power saw of claim 4 wherein said retaining block is disengaged from the at least one second retaining hole at said at least one of two opposite lateral sidewalls of said stand for enabling the tool rack to be turned from said close position to said open position when pressing said release handle downwards toward a bottom side of the releasing notch on the tool rack.

* * * * *